UNITED STATES PATENT OFFICE.

PETER FIREMAN, OF TRENTON, NEW JERSEY, ASSIGNOR TO MAGNETIC PIGMENT COMPANY, A CORPORATION OF NEW YORK.

PIGMENT AND METHOD OF PRODUCING SAME.

1,424,635. Specification of Letters Patent. Patented Aug. 1, 1922.

No Drawing. Application filed May 31, 1919. Serial No. 301,028.

*To all whom it may concern:*

Be it known that I, Dr. PETER FIREMAN, a citizen of the United States, residing at Trenton, in the county of Mercer, State of New Jersey, have invented certain new and useful Improvements in Pigments and Methods of Producing Same; and I do hereby declare the following to be a full, clear, and exact description of the invention, such as will enable others skilled in the art to which it appertains to make and use the same.

This invention relates to colored pigments produced by oxidation of ferrous hydroxide under suitable conditions and has for its particular object the production of relatively inexpensive yellow and brown pigments of fine texture and color and applicable to a wide variety of purposes.

The numerous advantages of the invention will be apparent upon examination of the following specification, in which I have described several preferred modes of procedure. It is to be understood that the description of my invention is illustrative merely, and that various modifications may be introduced through variation of the specified materials, their relative proportions and the temperatures employed, within the scope of the accompanying claims, it being my intention to claim as my invention the procedure whereby the advantageous results hereinafter described are accomplished.

When freshly precipitated ferrous hydroxide is oxidized a variety of products result depending upon various factors. Normally when the reaction occurs uncontrolled, in a solution from which the hydroxide is precipitated, a black precipitate of ferro-ferric oxide is produced which is undesirable for the purposes of my present invention. I have discovered that by variations of the completeness of precipitation of the iron and of the temperature, under which oxidation of ferrous hydroxide is carried out, the reactions may be directed to produce a number of valuable pigments. By the utilization therefore, of suitable precipitating reagents in predetermined proportions and the employment of air or other gaseous medium containing oxygen as an oxidizing agent, under controlled temperature conditions, I am able to produce the desired pigments in an effective, inexpensive and expeditious manner.

The character as well as the relative proportion of the precipitating reagent has a marked effect upon the resulting product and the temperature of the reaction must be carefully controlled to produce the desired results. I prefer to employ a mother liquor of ferrous chloride although other ferrous salts, such as sulfate, for example, are available but less desirable. As a precipitating agent, I preferably employ calcium hydroxide or sodium carbonate, but it is to be understood that other soluble hydroxides or carbonates capable of separating the iron as ferrous hydroxide may be substituted therefor. Preferably air is employed as the oxidizing material although oxygen or mixtures containing oxygen are also available for the purpose, air being preferred because it is effective and freely available. Sufficient steam is preferably introduced with the air to produce the desired temperature, the amount of steam being carefully regulated, so that the temperatures do not rise above a predetermined maximum and the increase in temperature occurs gradually and over a considerable period of time. The reaction is carried out in any suitable container or tank, preferably constructed to permit the distribution of air and steam through the solution.

As specific examples of the application of my invention, I shall describe the production of both yellow and brown pigments from solutions of ferrous chloride. To produce a yellow pigment, an aqueous solution of ferrous chloride of preferably about 1.060, specific gravity, is treated with sodium carbonate. The sodium carbonate is preferably added in a solid state, but may be previously dissolved. Preferably before the addition of the sodium carbonate, a lively current of air is blown through the ferrous chloride solution, with little steam only. The sodium carbonate is added in considerable excess while the current of air and steam continues. The heating of the solution by the steam is carried out at a rate which permits the temperature of the solution to rise to substantially 110° F. in about one hour, assuming a volume of solution sufficient to produce substantially one ton of the final product. The admission of steam is regulated so that the temperature of the solution at the end of the second hour is 140° F. and at the end of the third hour 160° F. The temperature is maintained at the latter point until all of the ferrous iron is converted into ferric iron. Sufficient steam is then admitted to raise the temperature of the solution to the boiling point which is maintained for substantially one half hour. The latter step, while not essential, facilitates the filtration of the product.

In the course of the reaction, the fresh precipitate of ferrous hydroxide is first light blue in color, then greenish blue, and finally acquires a yellowish tinge. Upon the continuation of the reaction, the precipitate becomes brownish yellow and finally a clear yellow which is characteristic of the final product. The precipitate is filtered, washed and dried in any suitable manner, the drying being preferably accomplished by means of steam coils and a product is obtained which is of low specific gravity and provides a clear yellow pigment of great color strength.

In an alternative form of my invention adapted to produce a yellow pigment, calcium hydroxide is employed in place of the sodium carbonate. The ferrous chloride solution having a specific gravity of 1.060 to 1.090 is treated with sufficient calcium hydroxide to precipitate from 75 to 85% of the iron. Air and steam are introduced during the precipitation of the iron, the steam being regulated so that the temperature is not permitted to rise above substantially 100° F. until oxidation is sufficiently complete to bring the ratio of ferrous to ferric iron in the precipitate to substantially 1:0.5. The amount of steam is then gradually increased until the boiling temperature is reached and is continued until oxidation is substantially complete.

The precipitate, at first light blue, becomes darker in shade. Then as the reaction continues, the color lightens, becomes greenish, then yellow in tinge and finally the precipitate assumes a clear yellow color. After filtering, washing and drying, the latter operation being conducted at substantially 100° F., a voluminous yellow pigment of fine texture is obtained.

In the production of brown pigments, I preferably employ a solution of ferrous chloride of a specific gravity of substantially 1.070 and add thereto sodium carbonate in quantity sufficient to produce an alkaline reaction during the introduction of air and steam. The temperature is controlled so that it does not rise above 110° F. during the first hour of operation, where the volume of solution is sufficient to produce one ton of the product. The supply of steam is carefully regulated so that the solution gradually approaches the boiling temperature, which is reached after 3 or 4 more hours and oxidation is continued at this temperature until substantially complete. The product after filtering, washing and drying is a brown pigment of velvety texture and brilliant color.

The procedure may be varied to produce a brown pigment by passing a current of air into a dilute solution of ferrous chloride to which calcuim hydroxide has been added in quantity sufficient only to partially precipitate the iron. Steam is supplied with the air to raise the temperature to substantially 105° F. and oxidation is completed between this temperature and substantially 130° F. The oxidation will be complete in the course of a few hours and by varying the degree of temperature, a series of pigments are obtained covering a range of tan shades, the pigment being voluminous and lustrous in color. The conditions surrounding the reaction must be carefully guarded, inasmuch as, if heated too energetically, black ferro ferric oxide is produced, which on continued oxidation yields a brown product, harsh in texture and devoid of lustre.

As above pointed out, sodium carbonate and calcium hydroxide are mentioned merely as indicative of the materials readily available and best adapted to the accomplishment of the desired result. Other soluble hydroxides or carbonates may be substituted and the proportions and temperatures mentioned may be varied dependent upon the strength and character of the reagents employed to produce a variety of well defined pigments.

The foregoing examples will be sufficient to enable anyone skilled in the art to practice the invention and produce pigments of the color and character described herein, but it is to be understood that various other pigments of a similar character may be produced through variation of the factors enumerated. Such variations are within the scope of my invention, which depends upon the discovery that the products resulting from the oxidation of freshly precipitated ferrous hydroxide may be varied in color and texture by suitable regulation of the temperature at which the oxidation is carried out.

From the foregoing it will be readily appreciated that I am able, through the operation of my invention to produce desirable pigments at a relatively slight expense and in quantity sufficient to meet increasing demands for material of this character. The raw materials for the production of pigments in accordance with my invention are readily available in the market and may be obtained in any quantity desired and at relatively low cost. No peculiar apparatus is essential to the operation of the invention and it is deemed unnecessary to illustrate or describe an apparatus for use in connection therewith, inasmuch as any chemist will readily devise from materials at hand, suitable apparatus for carrying out the invention on any desirable scale.

I claim:

1. A method of preparing colored pigments, which comprises precipitating ferrous hydroxide from an iron-containing solution, oxidizing the precipitated ferrous hydroxide in the mother liquor and controlling the oxidation by limiting the temperature of the mother liquor during the early stages of oxidation to a point below that at which black oxides form.

2. A method of preparing colored pigments, which comprises adding to an iron-containing solution a reagent capable of precipitating iron as ferrous hydroxide, injecting a gaseous oxidizing and heating medium into the mother liquor containing the ferrous hydroxide and controlling the oxidation by limiting the quantity of the gaseous medium injected during the early stages of oxidation to maintain the temperature of the mother liquor at a point below that at which black oxides form.

3. A method of preparing colored pigments, which comprises precipitating ferrous hydroxide from an iron-containing solution by adding sodium carbonate thereto, oxidizing the precipitated ferrous hydroxide in the mother liquor and controlling the oxidation by limiting the temperature of the mother liquor during the early stages of oxidation to a point below that at which black oxides form.

4. A method of preparing colored pigments, which comprises precipitating ferrous hydroxide from an iron-containing solution, oxidizing the precipitated ferrous hydroxide in the heated mother liquor and controlling the temperature of the mother liquor so that it does not materially exceed 110° F. during the early stages of oxidation to avoid the formation of black oxides.

5. As new articles of manufacture, the herein described colored pigments of voluminous body and brilliant color, consisting of the products of oxidation in the mother liquor of precipitated ferrous hydroxide at a temperature which does not exceed 110° F. during the early stages of oxidation.

6. A method of preparing brown pigment which comprises adding to a solution of ferrous chloride sufficient sodium carbonate to produce an alkaline reaction, partially oxidizing the precipitated ferrous hydroxide at a temperature of substantially 110° F. and completing oxidation at gradually increasing temperatures approaching 212° F.

7. As an article of manufacture, a brown pigment of brilliant color consisting of oxidized precipitated-ferrous hydroxide.

8. As an article of manufacture, a voluminous pigment of brilliant color consisting of oxidized precipitated-ferrous hydroxide.

In testimony whereof I affix my signature.

PETER FIREMAN.